(12) United States Patent
Franke et al.

(10) Patent No.: US 11,716,267 B2
(45) Date of Patent: Aug. 1, 2023

(54) METHOD FOR PROCESSING A MESSAGE AND VEHICLE USING THE METHOD

(71) Applicant: Joynext GmbH, Dresden (DE)

(72) Inventors: Lars Franke, Dresden (DE); Mathias Haberjahn, Dresden (DE)

(73) Assignee: Joynext GmbH, Dresden (DE)

( * ) Notice: Subject to any disclaimer, the term of this patent is extended or adjusted under 35 U.S.C. 154(b) by 0 days.

(21) Appl. No.: 18/073,637

(22) Filed: Dec. 2, 2022

(65) Prior Publication Data
US 2023/0198872 A1  Jun. 22, 2023

(30) Foreign Application Priority Data
Dec. 20, 2021 (DE) .......................... 102021133779.8

(51) Int. Cl.
*H04L 43/08* (2022.01)
*H04W 4/40* (2018.01)
*H04W 4/02* (2018.01)

(52) U.S. Cl.
CPC ............ *H04L 43/08* (2013.01); *H04W 4/025* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 2008/0004028 A1* | 1/2008 | Vincent | ................ | H04W 16/00 455/446 |
| 2013/0052961 A1* | 2/2013 | Horner | ................ | H04W 24/08 455/67.11 |
| 2013/0165151 A1* | 6/2013 | Gits | ...................... | H04L 67/303 455/456.3 |
| 2014/0064112 A1* | 3/2014 | Das | ...................... | G01S 5/0258 370/252 |

(Continued)

FOREIGN PATENT DOCUMENTS

| | | |
|---|---|---|
| DE | 102011078704 A1 | 1/2013 |
| DE | 102012210059 A1 | 12/2013 |
| DE | 102013226530 A1 | 6/2015 |

OTHER PUBLICATIONS

Office Action in DE 102021133779.8 dated Aug. 13, 2022.

*Primary Examiner* — Ernest G Tacsik
(74) *Attorney, Agent, or Firm* — Manelli Selter PLLC; Edward Stemberger (57) ABSTRACT

The invention relates to a method for classifying V2X messages and to a vehicle arranged to receive V2X messages and using the method to classify the received V2X messages. A method according to the invention for processing a message in a vehicle (100) comprises the steps of: receiving a signal (920) containing the message by means of a first antenna (111) and a second antenna (112); determining a relevance of the message (930) on the basis of signal characteristics and on the basis of navigation information of the vehicle (100); and processing the message with a ranking (Continued)

(940) corresponding to the determined relevance, wherein an attenuation map (300) assigns attenuation values to the vehicle environment on the basis of static objects (210) and dynamic objects (220) section by section. A vehicle according to the invention is arranged to use the relevance-based method for processing a message.

4 Claims, 4 Drawing Sheets

(56) References Cited

U.S. PATENT DOCUMENTS

| | | | | |
|---|---|---|---|---|
| 2014/0141803 A1* | 5/2014 | Marti | ............ | G01C 21/206 |
| | | | | 455/456.2 |
| 2014/0171098 A1* | 6/2014 | Marti | ............ | G01S 5/0294 |
| | | | | 455/456.1 |
| 2014/0221005 A1* | 8/2014 | Marshall | ............ | G01S 5/021 |
| | | | | 455/456.1 |
| 2016/0044504 A1* | 2/2016 | Edge | ............ | H04W 4/029 |
| | | | | 455/456.3 |

* cited by examiner

METHOD FOR PROCESSING A MESSAGE AND VEHICLE USING THE METHOD

The present invention relates to a method for processing a message and to a vehicle using the method. In particular, the invention relates to a method for classifying V2X-messages and to a vehicle set up to receive V2X messages and using the method to classify the received V2X messages.

BACKGROUND

Traffic concepts based on autonomous vehicles in particular require a high degree of networking both between individual road users and with the surrounding infrastructure, such as traffic lights or barriers. This type of traffic networking is known as Car2x (vehicle-to-everything, V2X). In particular, this includes vehicle-to-vehicle (V2V), vehicle-to-road (V2R), vehicle-to-infrastructure (V2I), vehicle-to-network (V2N) and vehicle-to-person (V2P) networking. To realize such networking concepts, messages can be exchanged between the individual network participants. This traffic information, correspondingly also referred to as V2X messages, can be used to optimize traffic flow and increase traffic safety, among other things. For example, the individual road users can each periodically communicate their current position and speed as well as the direction of movement, the type of vehicle or information about detected danger spots as a broadcast. However, unidirectional or bidirectional communication can also take place exclusively between individual road users.

In the future, the equipment rate for V2X systems among vehicles, non-motorized road users and the infrastructure will increase significantly. This will also significantly increase the number of simultaneously sent V2X-messages in a reception area. This leads to a high workload within the V2X units as well as the connected evaluation devices, in particular during the forwarding of the received signals or data packets from the antenna unit to the V2X-receiving unit, the decoding of all messages in the V2X receiving unit, possibly forwarding of all decoded messages to an evaluation control unit (e.g., in-vehicle infotainment, IVI), and processing of all messages within the evaluation control unit for relevance checking.

In order to ensure the processing of a large number of simultaneously received V2X messages, the bandwidth of the transmission within the vehicle network and the available computing capacities for security verification, decoding and processing of the large data volumes in real time must be adapted accordingly. On the one hand, this results in higher costs for the implementation of more powerful systems; on the other hand, a corresponding future increase in message density for V2X systems must already be taken into account.

If the system is under-dimensioned, there is otherwise a risk of important messages being lost or not taken into account in time. Particularly in critical high-load scenarios, not all messages can be evaluated and forwarded on time and as required. However, it can be assumed that for each road user only a fraction of the received messages is relevant for the surrounding traffic and therefore not every received signal has to be forwarded and decoded with the same priority.

It is therefore a task of the present invention to provide a method for processing a message in vehicles, which allows early prioritization of a signal containing the message and thus enables targeted message filtering via message prioritization, in particular in high-load scenarios. Furthermore, a vehicle applying the method according to the invention is to be provided.

SUMMARY

One aspect of the present invention relates to a method for processing a message in a vehicle, comprising the steps of: receiving a signal containing the message by means of a first antenna and a second antenna; determining a relevance of the message based on signal characteristics and based on navigation information of the vehicle; and processing the message with a ranking corresponding to the determined relevance, wherein assigns an attenuation map of the vehicle environment section-wise attenuation values are based on static objects and on dynamic objects.

A signal can be an analog or digital message signal transmitted as an electromagnetic wave, with the message typically being modulated onto a carrier. The message can be transmitted as a packet (e.g., using the IPv6 protocol). A message is considered to be any information that is in principle accessible for processing in accordance with the procedure. In particular, messages can be V2X messages (also referred to as V2X messages). However, the method according to the invention is not limited to messages for traffic networking. For example, a message may also have general indications of the environment (e.g., points of interest) or location-based advertising.

Preferably, the navigation information may have environment information and route information of the vehicle. The environment information includes, for example, the course and surface condition of roads, the topology of the environment, and other information relating to the environment. Route information is generally understood to be information relating to the current or planned direction of movement or travel of an object. In particular, this can be the current position and speed of a vehicle as well as its direction of travel, the course of a traveled lane, and changes in lane and direction of travel that have already been planned via route planning. The route information can also include an estimated future driving direction based on user behavior without active route planning.

The method according to the invention is relevance-based, i.e. an incoming signal is first prioritized on the basis of certain factors and only then processed according to a determined relevance sequence. In particular, it is provided that prioritization according to the invention can be performed independently of the actual content of the message. The relevance of the message is determined on the basis of signal properties (i.e., the properties of the signal transmitting the message) and on the basis of navigation information of the vehicle (e.g., current position and speed as well as direction of travel, planned changes in direction of travel, etc.).

A decoding of the message is therefore not necessary and can therefore still be carried out after the prioritization according to the invention has been completed. Independently of such prioritization, however, further general or application-specific prioritization or reprioritization of the individual pre-prioritized messages can of course also be performed on the basis of the content of the decoded message following decoding.

After completion of the relevance determination, the message is processed with a ranking corresponding to the determined relevance. Processing means in particular evaluating the content of the message and possibly initiating a reaction or action corresponding to the content. If no decoding of the message has been performed in advance, processing according to the invention can also comprise decoding of the message and a general or application-specific prioritization or reprioritization of the pre-prioritized messages described above. However, decoding is independent of a relevance determination according to the embodiment and can, for example, also be performed in parallel with the relevance determination. In this case, the result of the relevance determination can be assigned directly to the message that has already been decoded, but without the content of the message or any additional message-internal prioritization feature having to have been processed in advance.

An attenuation or signal strength map assigns attenuation values (or corresponding signal strength values) to the vehicle environment section by section on the basis of static and dynamic objects located between a receiver unit and a transmitter unit. In this context, attenuation map is understood to be, in particular, an assignment of known or position-dependent calculated attenuation values with respect to an expected reception strength of the signal of a standard transmitter (i.e., identical transmitters with the same transmission power) located at different positions in the environment. Here, the environment is divided into individual sections (so-called sections), each of which is assigned a common attenuation value. In other words, an attenuation map describes with which relative reception strength a standard transmitter from each individual section can be received at the receiver (corresponds to signal strength map).

The attenuation map is preferably egocentric to the vehicle and is adapted to the respective current environment. In addition to the distance between the transmitter and receiver unit, signal attenuating or scattering objects between the transmitter and receiver must also be taken into account. A distinction must be made here between static objects and dynamic objects. Objects that are stationary and where no movement is expected are regarded as static objects. These include, for example, houses, hills, tunnels, bridges, traffic lights and green vegetation. In contrast, objects that are not stationary and where movement is to be expected are referred to as dynamic objects. These can be other road users, but also barriers or other moving objects. Pedestrians and other persons are also regarded as dynamic objects.

In the case of static objects, their position is usually known in advance (e.g., via a navigation module and/or map data). Corresponding attenuation values can be derived from corresponding models or from additional information on the type or attenuation of the individual static objects stored in the navigation module or in a further database, e.g., for the creation of an attenuation map. Accordingly, dynamic objects can also be considered with their respective attenuation values, but these must first be recorded or otherwise registered. In addition, further information about the individual dynamic objects can be used to create an attenuation map. An egocentric attenuation map can then be generated from all the attenuation values determined.

The reception of a signal is thus subject to a attenuation or signal strength map, which is made up of a static and dynamic component with the corresponding attenuation values in each case. The static part describes in particular the vehicle environment with known attenuation values due to static objects (e.g. buildings (height, width, depth, material), trees, bushes etc.) as signal absorbers or scatters. The dynamic part allows to infer, for example via at least one object giving sensor (e.g., radar, camera, infrared, LiDAR), surrounding objects (e.g., further moving or stationary road users, buildings, trees etc.) in the respective situation, which can also impair or block signals. Based on this, the signal strength map can be built dynamically as an egocentric mapping and describes the vehicle environment section-wise (tiles) with respect to a signal strength to be received (as a function of signal strength and distance to the ego position).

Based on this classification, the received message can be better located and thus prioritized or its relevance determined according to the invention. In this context, a signal strength map is to be regarded as equivalent to an attenuation map, whereby the signal strength map results unambiguously from the associated attenuation map, taking into account a certain predefined transmission power. In general, V2X transmitting units are equipped with a predefined uniform transmitting power, so that a direct assignability between an attenuation map and an associated signal strength map results therefrom.

The static portion of the attenuation or signal strength map results individually for each geographical location and depends on a large number of different factors. In particular, new construction of buildings or other permanent structural or natural changes can significantly alter the respective directional attenuation values. It is therefore advantageous to be able to record such changes in the attenuation values and, for example, store them in a corresponding database for retrieval. This is in line with the general recommendation that map material available for route navigation should always be kept up to date.

In environments where no or hardly any dynamic objects present, for example, a comparison with the known static attenuation map can be made after decoding a received message and after corresponding evaluation of the content via a position communicated therein and the received signal strength detected on the vehicle. If the position communicated in the message deviates from the position of the transmitter determined with the aid of the method according to the invention via the attenuation map, it can be assumed that possibly the associated static attenuation values have changed at least for the direction of reception. If such deviations are repeatedly communicated by several vehicles independently of each other at different times, for example to a corresponding database operator, the latter can adjust its attenuation values provided e.g. via a cloud connection accordingly. With this approach, the static attenuation values can thus be updated by a kind of "swarm intelligence" from the vehicles involved.

The dynamic part of the attenuation or signal strength map can be used to generate traffic forecast data. Thus, based on historical measurement data, it is possible to estimate when, where and how much attenuation is to be expected. The data obtained in this way can then be used as another factor for prioritizing messages or for more efficient route planning.

Preferably, a method according to the invention further comprises the steps of:
 detecting received signal strengths and received times of the signal at the first antenna and at the second antenna;
 determining a section of the attenuation map corresponding to a sender of the signal on the basis of the determined received signal strengths and the received times; and
 determining the relevance of the message on the basis of the determined section of the attenuation map and on the basis of the navigation information.

By means of a detection of received signal strengths and of reception times of the signal at the first antenna and at the second antenna, the direction from which the signals are coming can be determined (direction determination) by means of corresponding transit time differences. This determination then allows a section of the attenuation map corresponding to a sender of the signal to be determined with the aid of the attenuation map (distance determination). Subsequently, the relevance of the message can be determined on the basis of the at least approximately determined section of the attenuation map and on the basis of the known navigation information.

Distance determination can be used to determine the relevance of a message based on distance. For example, individual messages originating from the immediate vicinity of the receiver unit (e.g., at a vehicle) can be assigned a higher priority if:

A complex traffic situation is expected due to the map topology (e.g., city traffic with multiple lanes, separate lanes, major intersections or traffic circles, etc.).
  A turning/crossing driving maneuver is to be expected due to the map topology (e.g., from the ego vehicle or other road users).
  The vehicle sensors (e.g., radar, camera, infrared, LiDAR) detect an environment obstructing the view (e.g., bicycle lane obscured by parked vehicles/trees, which is known due to the map topology, but is not detected/captured by the sensors).
  A lower priority may be assigned, for example, if:
  The vehicle sensors (e.g., radar, camera, infrared, LiDAR) fully perceive the environment.
  The transmitter unit is located behind the receiver unit.

Preferably, a method according to the invention further comprises the steps of:

creating a relevance map assigning relevance values to the vehicle environment section by section based on the navigation information;
  determining a section of the relevance map corresponding to a position of the sender; and
  assigning the relevance of the determined section of the relevance map to the received signal.

Preferably, the relevance map can be created based on the navigation information and the attenuation map and/or the section of the relevance map is determined based on a corresponding section of the attenuation map.

In addition to prioritization based on the attenuation map, the relevance map provides a further means of determining relevance. Since the position of the sender in the environment is also required for a prioritization via a relevance map according to the embodiment, a corresponding localization can also be carried out here by means of an attenuation map and the method described above for determining a section of the attenuation map corresponding to a sender of the signal. Analogous to the attenuation map, the relevance map represents a sectional, preferably also egocentric mapping of the respective current environment. Instead of the attenuation values (or signal strength values) in the individual sections, however, a relevance assigned to the respective section is directly indicated for the evaluation of messages.

The prioritization of these relevance values can be based in particular on hazards that may arise for the vehicle from these segments or, in contrast, on a rather low hazard potential.

For example, in the case of lanes that are structurally separated from one another, messages from vehicles in its own lane can be assigned a higher relevance than messages from vehicles in the opposite lane. In addition to such prioritization based on general risk considerations, relevance can also be determined based on general distance and position relationships as described above. In this respect, in the case of lanes that are structurally separated from one another, vehicles in their own lane can also be assigned a more extensive relevance classification based on distance, i.e. here too, messages from nearby vehicles can be assigned a higher priority than messages from vehicles further away (i.e., despite any equal-ranking relevance according to the corresponding relevance map).

For lanes that are not structurally separated from each other, high priority can be assigned to the opposite direction, for example, if:

Expecting a turning/crossing maneuver based on the map topology is (e.g., from the ego vehicle or other road users).
  When several transmitter objects move in a group one after the other (possible overtaking maneuvers, unexpected swerving).

On the other hand, in the case of lanes that are not structurally separated from each other, a low priority can be assigned to the opposite direction, for example, if:

No turning/crossing maneuvers are expected due to map topology.
  The transmitting object has already passed the ego vehicle and is therefore in the rear.

A relevance map can thus be derived completely rule-based from a current map topology. However, additional information can also be incorporated into an underlying risk assessment. In particular, the accuracy of the relevance map can be increased by evaluating other available information. For example, if it is known from other sources that icy conditions are to be expected in an intersection area, this information can also be included in the risk assessment and lead to a higher relevance rating in this sector than if such a relevance rating were to be based only on a topology-based rule set, for example.

The section divisions of the attenuation map and the relevance map are preferably congruent with each other or at least designed in such a way that a clear assignment between the individual sections in the attenuation map and the relevance map is possible. However, the individual mappings can also deviate from each other, in which case the relevance values to be determined can possibly only be determined approximately on the basis of determined sections of the attenuation map.

Preferably, static relevance values are assigned to each of the individual sections of the relevance map based on the environment information and/or based on the static attenuation values, and dynamic relevance values are assigned to each section based on the route information and/or based on the dynamic attenuation values.

A distinction between static and dynamic relevance values has the advantage that the static relevance values can be calculated in advance or taken directly from a database due to their stationary character. For example, a complete static relevance map along the planned route can already be created in the background during route planning. In this case, only the dynamic relevance components need to be determined when creating a relevance map. This reduces the computational effort required to determine the (overall) relevance maps consisting of a static and a dynamic component. For the mutual assignability of the individual sections of the attenuation map and the corresponding sections of the relevance map, reference is made to the preceding paragraphs.

Preferably, a method according to the invention further comprises at least one of the following steps:
- reading out the environment information from a navigation module (e.g., from local map data or cloud-based);
- determining the route information by the navigation module as well as an in-vehicle sensor;
- reading out the static attenuation values from a database and/or determining the dynamic attenuation values by an object-giving sensor.

A navigation module can in particular be a vehicle component set up to perform navigation. Preferably, the navigation module has a communication link with a database for retrieving current environment and/or traffic information. Route information may be provided by the navigation module as well as at least one sensor internal to the vehicle. In particular, the navigation module may provide, for example, the current position and speed of the vehicle (e.g., via a navigation satellite system) and the course of a lane. Furthermore, the route information provided by the navigation module may also have advanced route planning. An in-vehicle sensor may be, for example, a speed sensor or a temperature sensor. An object sensor for detecting the environment is understood to mean, in particular, radar, camera, infrared or LiDAR.

A method according to the invention is thus used for prioritizing received messages in a vehicle, wherein after a message has been received, the message is classified using an attenuation map, wherein a priority can be assigned to the message as a function of a determined attenuation value and/or the message is classified using a relevance map, wherein the relevance map represents priority zones as a function of a driving route, wherein a ranking is defined on the basis of the assigned priority in which the message is processed in relation to another received message.

The main idea of the present embodiment thus lies in particular in being able to carry out an early relevance-controlled prioritization of the received messages in a vehicle already at the signal level. In this way, transmission and processing costs within the vehicle can be minimized and, in particular, a delay or even a loss of important messages in high-load scenarios can be avoided. To determine the relevance of a message, the direction and distance of a transmitter unit transmitting the received signal can first be estimated or determined.

To determine the direction, in particular the time offset is measured when receiving the identical signal at a pair of antennas with the widest possible base spacing. To determine the distance of a transmitting unit, the received signal strength of the signal is used. Using a dynamically generated egocentric attenuation map and the previously determined direction, it is then possible to determine, at least approximately, the section containing the origin of the signal, i.e., the position of the transmitting unit. Thus, each message can be spatially located with respect to the receiving unit without prior decoding of the message of the transmitting signal. The priority zones of the relevance map can be determined depending on the navigation/route from the navigation/user profile, whereby, for example, the respective direction of travel can be given a higher priority than the opposite direction or, in the case of a (planned) change of direction, the direction in which the journey is to be continued is given a higher priority.

In a method according to the embodiment, the individual steps can be defined with respect to an antenna unit and a control unit. When a signal containing a new V2X message is received at both antennas, the reception quadrant or the direction to the transmitter can be determined via the reception order or the reception offset between the two antennas. The distance to the transmitter can be derived at least approximately from the strength of the received signal with the aid of an associated attenuation map (or a signal strength map analogous to this). This results in a direct limitation of the position range of the transmitting object. The steps mentioned are preferably carried out within the antenna unit. A further relevance detection and a prioritization of the raw data depending on a matching of the determined position range of the transmitting object into the relevant parts of the relevance map can subsequently be performed in the control unit (derivation of the further processing priority). The control unit can further provide (preferably with the map update frequency) a current relevance map (e.g., depending on the temporal and spatial reachability as well as on the driving strategy between the receiving object and the ego vehicle) to the antenna unit, whereby the relevance map should divide the environment of the vehicle as seamlessly as possible into different priority zones.

Another aspect of the present invention relates to a vehicle, comprising:
- a communication module adapted for wireless communication with another vehicle or road user (motorcyclist, pedestrian, cyclist, e-scooter rider, drone, etc.);
- a memory containing navigation information of the vehicle and a vehicle environment sectional attenuation value based on the vehicle environment;

and/or an infrastructure adjacent to the vehicle, comprising:
- a communication module having a first antenna and a second antenna;
- a memory containing navigation information of the vehicle and an attenuation map assigning attenuation values based on static objects and dynamic objects to the vehicle environment section by section; and
- a control unit adapted to: drive the first antenna and the second antenna to receive a signal containing a message, determine a relevance of the message based on signal characteristics and based on the navigation information, process the message with a ranking corresponding to the determined relevance.

Preferably, a vehicle according to the invention may further comprise: a navigation module configured to read out environment information and to determine route information; a database access configured to read out static attenuation values; an object-giving sensor configured to determine dynamic attenuation values of the vehicle environment, and/or an in-vehicle sensor configured to determine route information of the vehicle.

Another aspect of the present invention relates to a control unit for a vehicle according to the invention, comprising a memory containing instructions which, when executed by the control unit, cause it to perform the steps of the method according to the invention.

Both the vehicle and the control unit are thus both set up to carry out the method according to the invention. The features mentioned for the vehicle and the control unit therefore arise directly as components required for carrying out the method according to the invention. In this respect, reference is made in each case to the corresponding explanations of the method with regard to their specific function, the respective technical effects and the advantages and embodiments resulting therefrom in accordance with the invention.

In addition, database access can be provided, for example, via an interface to a database for static attenuation values stored in the navigation module. However, the database can also be stored outside the vehicle and accessed via a communication link (cloud-based, V2N). Hybrid database solutions are also possible, in which only part of the static attenuation values is stored in the navigation module and the rest is retrieved via a communication link.

Further preferred embodiments of the invention result from the features mentioned in the dependent claims.

The various embodiments of the invention mentioned in this application can be advantageously combined with each other, unless otherwise specified in the individual case.

BRIEF DESCRIPTION OF THE DRAWINGS

The invention is explained below in embodiment examples with reference to the accompanying drawings, wherein.

DETAILED DESCRIPTION OF EXAMPLE EMBODIMENTS

Figure 1:
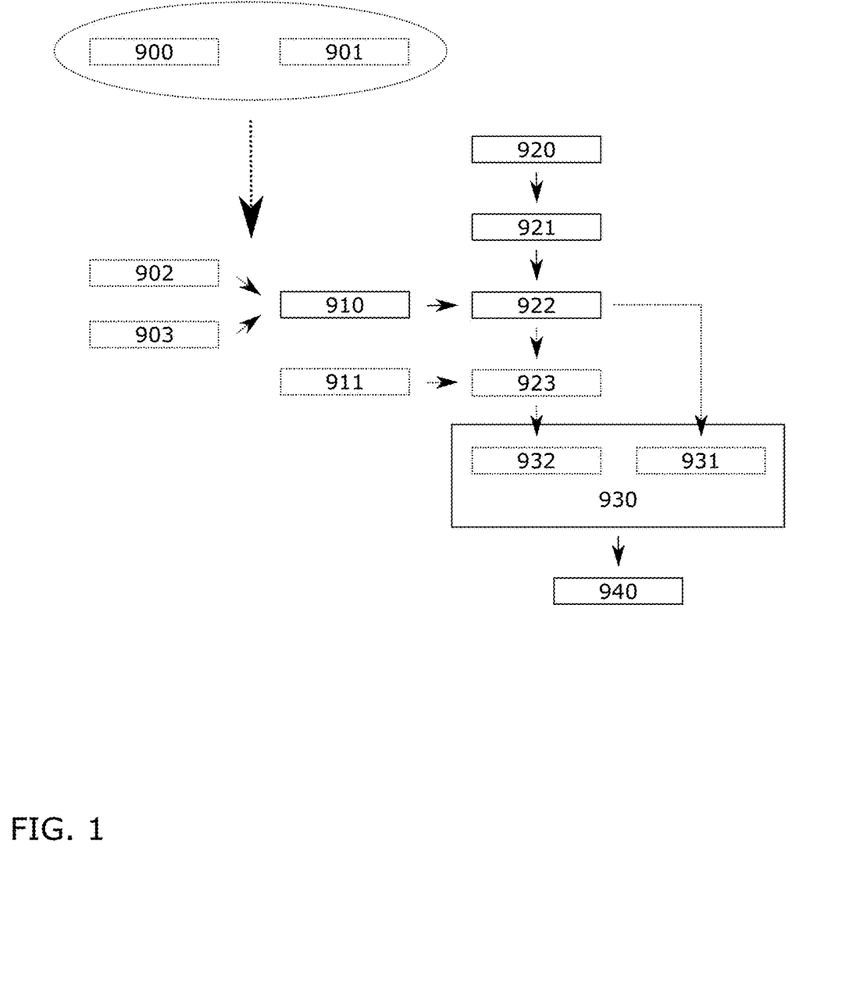
FIG. 1 an exemplary schematic representation of the individual steps of a process according to the invention, FIG. 2 an exemplary schematic representation of the c) composition of a attenuation map from a) a static and b) a dynamic attenuation map, FIG. 3 an exemplary schematic representation of a relevance map a) without and b) with consideration of a route planning, and FIG. 4 a schematic representation of an exemplary embodiment of a vehicle according to the invention.

FIG. 1 shows an exemplary schematic representation of the individual steps of a method according to the embodiment. The reception of a signal 920 containing a message and the detection of received signal strengths and of reception times of the signal 921 relate directly to the reception of a message and can therefore preferably be carried out directly by a corresponding communication module (110). Subsequently, a section corresponding to a sender of the signal can be determined in an attenuation map (300) 922, with the detected signal properties being evaluated for this purpose.

Once the section in the attenuation map (and thus the approximate position of the sender) has been determined, a determination of the relevance of the message 930, in particular a determination of the relevance of the message on the basis of the determined section of the attenuation map (300) and on the basis of the navigation information 931, can be made on this basis. Additionally or alternatively (optional steps are dotted in the schematic), the determined section in the attenuation map (300) can be used to determine a section corresponding to a position of the sender in a relevance map (400) 923. In this case, too, a determination of the relevance of the message 930 can subsequently be carried out, in particular by assigning the relevance of the determined section of the relevance map (400) to the received signal 932. If the relevance of a message is determined using both the attenuation map (300) and the relevance map (400), a corresponding weighting of the relevance values resulting from both maps is preferably to be carried out when determining the relevance of the message 930. Once the relevance of the message has been determined, the message can be processed with a ranking 940 corresponding to the determined relevance.

In addition to this sequence directly relating to message prioritization, further steps are also provided in accordance with the invention which relate to the provision of additional information required in the process. These include the creation of a attenuation map (300) 910 that assigns attenuation values to the vehicle environment section by section, and optionally the creation of a relevance map (400) 911 that assigns relevance values to the vehicle environment section by section. For both maps, it may be necessary to read out environment information from a navigation module (140) 900 and/or to determine route information by the navigation module (140) and an in-vehicle sensor (160) 901. Furthermore, for the creation of the attenuation map, a readout of static attenuation values from a database 902 as well as a determination of dynamic attenuation values by an object-giving sensor (150) 903 may be provided first.

Figure 2:
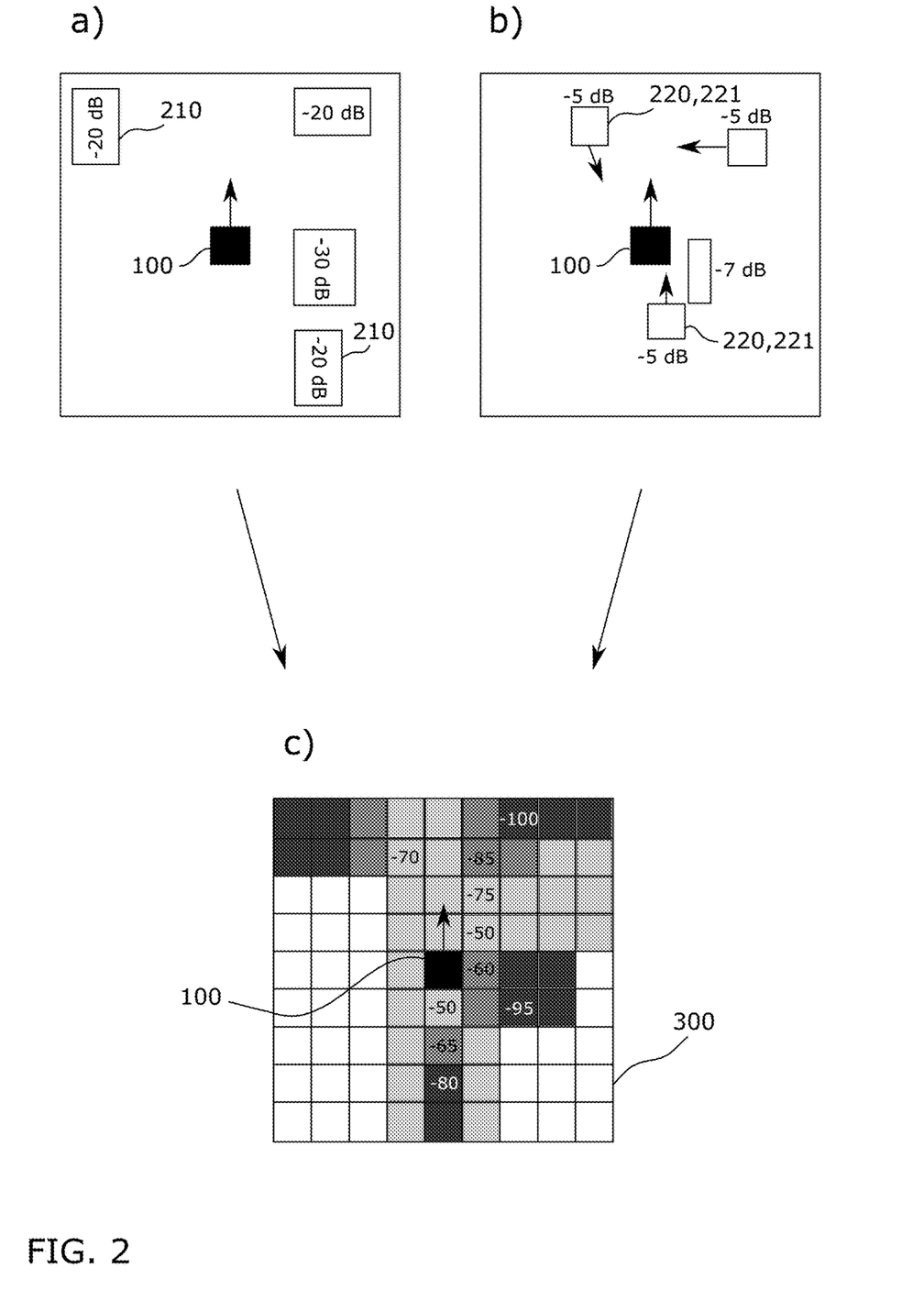

FIG. 2 shows an exemplary schematic representation of the c) composition of a attenuation map from a) a static and b) a dynamic attenuation map. The static attenuation map shown under a) concerns static objects 210 and assigns the corresponding known attenuation values to these objects. The ego-vehicle 100 is thereby entered egocentrically with an associated direction of motion. The dynamic attenuation map shown in b) is intended to represent the same environment at the identical point in time, but only includes dynamic objects 220, 221, i.e. objects that can be assumed to be essentially variable in location. These may be, for example, other vehicles or other road users 221. However, these do not have to be currently in motion, but can also be parked vehicles or persons waiting at a traffic light.

In c), the two separate attenuation maps a) and b) are combined to form a common attenuation map 300 with corresponding segmentation into individual areas. The selected square segmentation was used here for illustrative purposes only and may differ. If the transmitter direction and the measured received signal strength at the vehicle 100 are known, the position of the transmitter belonging to a received signal can thus be taken directly from the attenuation map 300, at least approximately.

Figure 3:
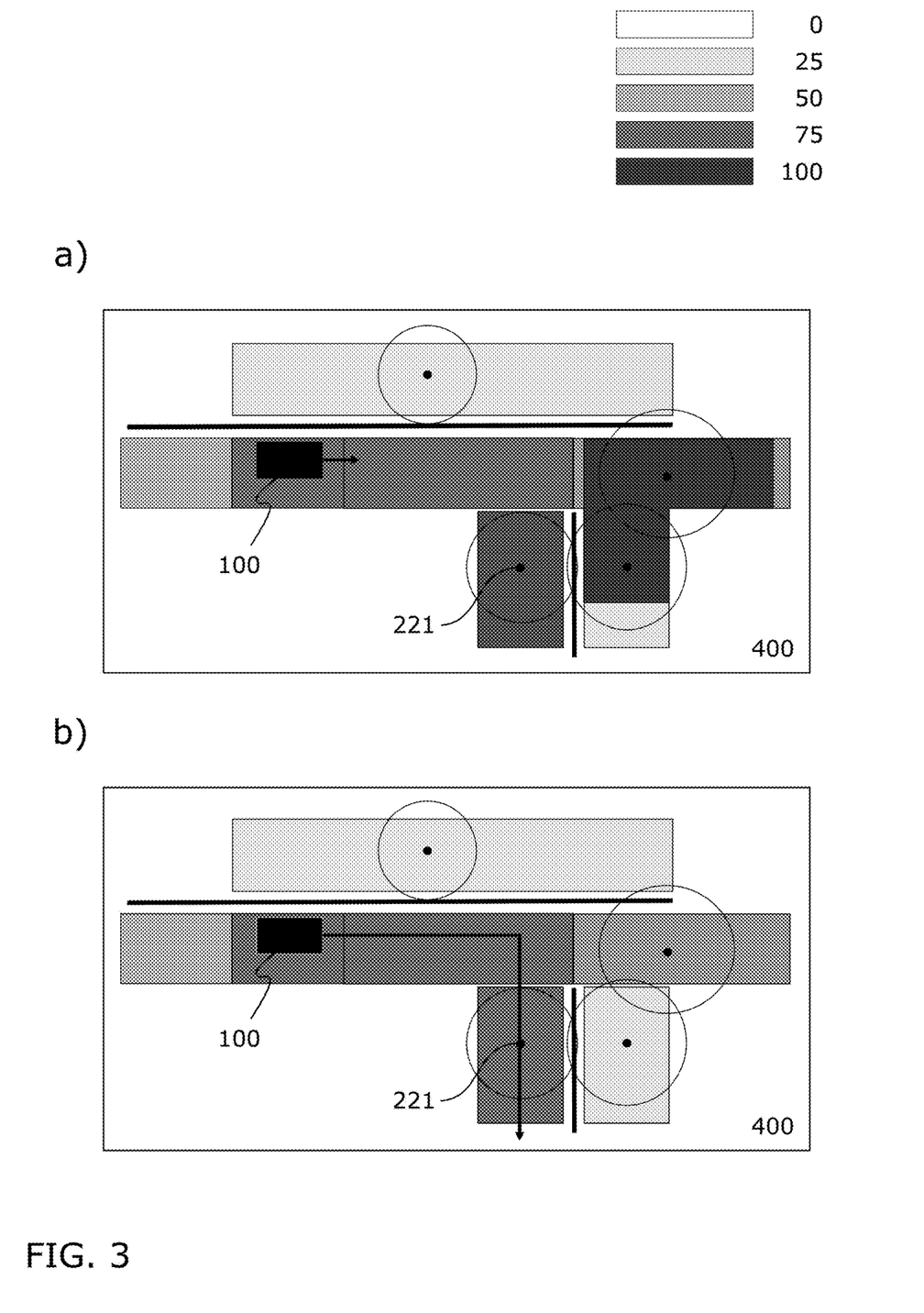

FIG. 3 shows an exemplary schematic representation of a relevance map 400 a) without and b) with consideration of a route planning. In the examples shown, it is an intersection with structurally separated directions of travel in each case. The structural separation is indicated by the black bars. The ego vehicle 100 moves horizontally to the right in both cases. In this scenario, other vehicles or other road users 221 are involved in the traffic event. The relevance map 400 is divided in each case into segments describing their message relevance (due to hazards and risks possibly arising in these areas). The relevance is illustrated by different shading of the individual segments according to the legend. The figures are only intended to help the reader understand the facts; relevance can also be classified in other ways. The scaling chosen in the illustration, for example, ranges from 0 (lowest relevance) to 100 (maximum relevance).

In FIG. 3a) the situation is shown without considering a route planning. Only a low relevance is assigned to messages from oncoming vehicles, corresponding messages from vehicles at a greater distance or very far behind the ego vehicle 100 are assigned the lowest relevance. Since no route planning is available for the determination of relevance, it is assumed that the direction of travel is maintained. Accordingly, the section of roadway immediately behind the intersection is considered to be potentially the most dangerous (e.g., turning, slow-moving road users, tailbacks, etc.) and messages from vehicles from this section are consequently assigned maximum relevance.

In FIG. 3b) the same situation is shown, but here in the relevance map 400 a route planning of the ego vehicle 100 is also taken into account. This provides that the ego vehicle 100 is to turn right at the intersection and that it will therefore not pass the intersection area. In contrast to the situation depicted in a), messages from vehicles in the immediate intersection area can thus be assigned a significantly lower relevance. This shows that the relevance map 400 can change depending on the available information and should be continuously adapted to the current traffic situation. In particular, in addition to directional and route planning information, if available, corresponding information from other road users can also be taken into account.

Figure 4:
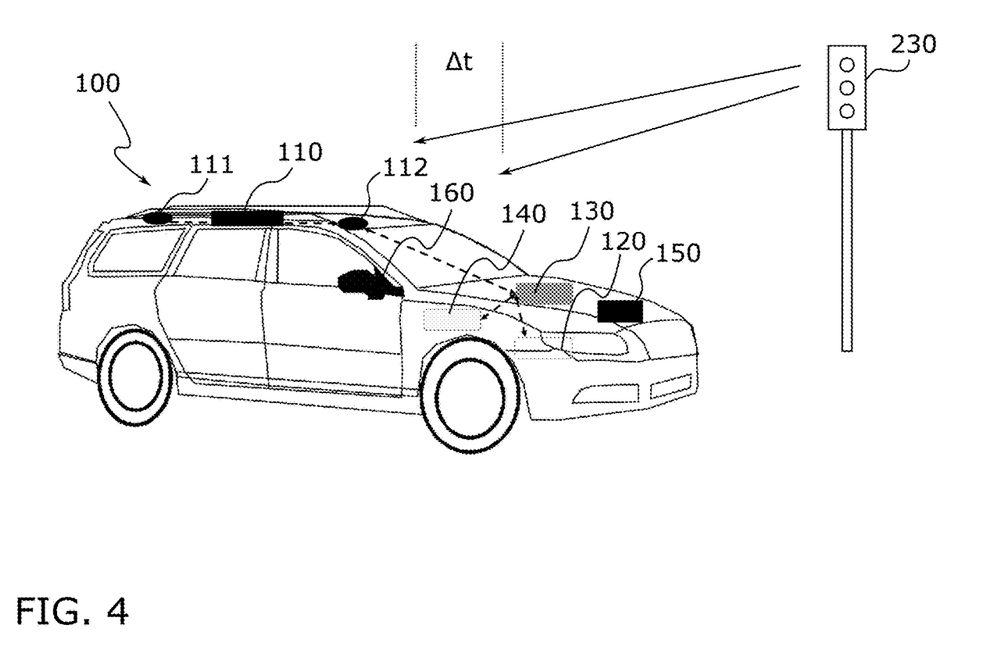

FIG. 4 shows a schematic representation of an exemplary embodiment of a vehicle 100 according to the invention. The vehicle 100 has:

a communication module 110 with a first antenna 111 and a second antenna 112 designed for wireless communication with another vehicle or another traffic participant 221 (not shown) and/or an infrastructure 230 adjacent to the vehicle;

a memory 120 containing navigation information of the vehicle and an attenuation map 300 assigning attenuation values to the vehicle environment section by section on the basis of static objects 210 (not shown) and dynamic objects 220 (not shown) (i.e., for example, another vehicle or another traffic participant 221 (not shown)); and a control unit 130 adapted to drive the first antenna 111 and the second antenna 112 to receive a signal containing a message, determine a relevance of the message based on signal characteristics and based on the navigation information, and process the message with a ranking corresponding to the determined relevance.

Furthermore, an example of an adjacent infrastructure 230 is shown in the form of a traffic light. A signal transmitted to the vehicle by the traffic light, for example, is detected by the first antenna 111 and the second antenna 112 with a time offset Δt.

A vehicle 100 according to the invention may further comprise: a navigation module 140 configured to read out environment information and to determine route information; a database access configured to read out static attenuation values (e.g., via a cloud connection or a database present locally in the vehicle); an object-giving sensor 150 configured to determine dynamic attenuation values of the vehicle environment, and/or an in-vehicle sensor 160 configured to determine route information of the vehicle.

LIST OF REFERENCE NUMBERS 100 vehicle
110 communication module
111 first antenna
112 second antenna
120 memory
130 control unit
140 navigation module
150 object sensor
160 internal vehicle sensor
210 static object
220 dynamic object
221 other vehicle or other road user
230 vehicle adjacent infrastructure
300 attenuation map (or corresponding signal strength map)
400 relevance map
900 reading out environment information from a navigation module (140)
901 determination of route information by the navigation module (140) and an in-vehicle sensor (160)
902 reading static attenuation values from a database
903 determining dynamic attenuation values by an object-generating sensor (150)
910 create an attenuation map assigning attenuation values to the vehicle environment section by section (300)
911 creating a relevance map assigning relevance values to the vehicle environment section by section (400)
920 receiving a signal containing a message
921 capture of received signal strengths and of reception times of the signal
922 determining a section of the attenuation map (300) corresponding to a sender of the signal.
923 determining a section of the relevance map (400) corresponding to a position of the sender.
930 determining the relevance of the message
931 determining the relevance of the message based on the determined section of the attenuation map (300) and based on the navigation information.
932 assigning the relevance of the determined section of the relevance map (400) to the received signal
940 processing the message with a ranking corresponding to the determined relevance

The invention claimed is:

1. A method for processing a message in a vehicle, comprising the steps:
   receiving a signal containing the message by means of a first antenna and a second antenna;
   determining a relevance of the message based on signal characteristics and based on navigation information of the vehicle; and
   processing the message with a ranking corresponding to the determined relevance,
      wherein an attenuation map assigns section-wise attenuation values to the vehicle environment based on static objects and on dynamic objects.

2. The method according to claim 1,
   wherein the navigation information comprises environment information and route information of the vehicle.

3. A vehicle, comprising:
   a communication module configured for wireless communication with another vehicle or another road user and/or an infrastructure adjacent to the vehicle, comprising a first antenna and a second antenna;
   a memory containing navigation information of the vehicle and an attenuation map assigning section-by-section attenuation values to the vehicle environment based on static objects and dynamic objects; and
   a control unit adapted to:
      to drive the first antenna and the second antenna to receive a signal containing a message,
      determine a relevance of the message based on signal characteristics and on the navigation information, and
      process the message with a ranking corresponding to the determined relevance.

4. The vehicle of claim 3,
   further comprising:
      a navigation module arranged to read out environment information and to determine route information;
      a database access set up for reading static attenuation values;
      an object-generating sensor designed to determine dynamic attenuation values of the vehicle environment, and/or
      an in-vehicle sensor configured to determine route information of the vehicle.

* * * * *